US008115872B2

(12) United States Patent
Kim et al.

(10) Patent No.: US 8,115,872 B2
(45) Date of Patent: Feb. 14, 2012

(54) METHOD OF CAPTURING DIGITAL BROADCAST IMAGES IN A DIGITAL BROADCAST RECEIVING TERMINAL

(75) Inventors: Kang-Wook Kim, Daegugwangyeok-si (KR); Jong-Kerl Lee, Gumi-si (KR)

(73) Assignee: Samsung Electronics Co., LTD (KR)

( * ) Notice: Subject to any disclaimer, the term of this patent is extended or adjusted under 35 U.S.C. 154(b) by 1524 days.

(21) Appl. No.: 11/546,044

(22) Filed: Oct. 11, 2006

(65) Prior Publication Data

US 2007/0081079 A1 Apr. 12, 2007

(30) Foreign Application Priority Data

Oct. 11, 2005 (KR) ........................ 10-2005-0095427

(51) Int. Cl.
*H04N 5/44* (2011.01)
(52) U.S. Cl. ...................................................... 348/559
(58) Field of Classification Search .......... 348/559–562, 348/584, 586, 597–598; 455/186.1, 185.1, 455/179.1; 375/240.1
See application file for complete search history.

(56) References Cited

U.S. PATENT DOCUMENTS

| | | | | |
|---|---|---|---|---|
| 4,933,703 A | * | 6/1990 | Terui | 396/242 |
| 5,318,033 A | * | 6/1994 | Savord | 600/447 |
| 5,431,167 A | * | 7/1995 | Savord | 600/443 |
| 5,678,552 A | * | 10/1997 | Savord | 600/447 |
| 6,271,879 B1 | * | 8/2001 | Overton | 348/180 |
| 6,340,997 B1 | * | 1/2002 | Borseth | 348/731 |
| 6,987,535 B1 | * | 1/2006 | Matsugu et al. | 348/239 |
| 7,250,983 B2 | * | 7/2007 | Lin et al. | 348/584 |
| 7,313,183 B2 | * | 12/2007 | Bazin et al. | 375/240.01 |
| 7,376,699 B2 | * | 5/2008 | Morris | 709/203 |
| 2002/0083463 A1 | * | 6/2002 | Camara | 725/110 |
| 2003/0027517 A1 | * | 2/2003 | Callway et al. | 455/3.01 |
| 2003/0232593 A1 | | 12/2003 | Wahlroos et al. | |
| 2004/0075654 A1 | * | 4/2004 | Hsiao et al. | 345/418 |
| 2004/0120584 A1 | * | 6/2004 | Jang et al. | 382/232 |
| 2004/0214541 A1 | * | 10/2004 | Choi | 455/186.1 |
| 2005/0122430 A1 | * | 6/2005 | Lee et al. | 348/559 |

FOREIGN PATENT DOCUMENTS

| | | |
|---|---|---|
| JP | 2004-128884 | 4/2004 |
| KR | 1020040071643 | 8/2004 |
| KR | 10-2004-0093208 | 11/2004 |
| KR | 10-2005-0066269 | 6/2005 |
| KR | 10-2006-0022860 | 3/2006 |

* cited by examiner

*Primary Examiner* — Paulos Natnael
(74) *Attorney, Agent, or Firm* — The Farrell Law Firm, P.C.

(57) ABSTRACT

A method of capturing digital broadcast images in a digital broadcast terminal is provided. Upon request for output of digital broadcasting from a user, video frames of received digital broadcast frames are decoded. Upon request for a multi-capture function from the user, digital broadcast images of the decoded video frames are captured at a predetermined number of shots per unit time and stored.

14 Claims, 4 Drawing Sheets

METHOD OF CAPTURING DIGITAL BROADCAST IMAGES IN A DIGITAL BROADCAST RECEIVING TERMINAL

PRIORITY

This application claims priority under 35 U.S.C. §119 to an application entitled "Method of Capturing Digital Broadcast Images in a Digital Broadcast Receiving Terminal" filed in the Korean Intellectual Property Office on Oct. 11, 2005 and assigned Serial No. 2005-95427, the contents of which are incorporated herein by reference.

BACKGROUND OF THE INVENTION

1. Field of the Invention

The present invention relates generally to a digital broadcast receiving terminal, and in particular, to a method of capturing digital broadcast images in a digital broadcast receiving terminal.

2. Description of the Related Art

Digital broadcasting provides high-definition, high-quality and better broadcasting service, replacing traditional analog broadcasting. The digital broadcasting is classified into satellite digital broadcasting and terrestrial digital broadcasting.

Satellite digital broadcasting aims mainly at mobile service. Thus it enables viewing of multichannel, multimedia broadcasting through a portable receiver (mobile phone or Personal Digital Assistant (PDA)) or a vehicular receiver, irrespective of time and place.

The concept of terrestrial digital broadcasting originated from Digital Audio Broadcasting (DAB), and provides mobile multimedia broadcasting through a currently available vacant channel, Very High Frequency (VHF) channel 12. It transmits television broadcasting, radio broadcasting and data broadcasting on a plurality of channels. While a conventional terrestrial broadcasting service provider operates a single analog channel, a digital broadcasting service provider operates a plurality of channels. A digital data stream with various different services embedded is called an ensemble.

In terrestrial digital broadcasting, three ensembles can be transmitted on one VHF channel and one video channel, two audio channels, and one data channel can be serviced per one ensemble.

Along with the development of digital broadcasting technology and mobile communication technology, recently there has been an increasing interest in a digital broadcasting service that allows users to view digital broadcasting while moving. Particularly, Digital Multimedia Broadcasting (DMB) through a mobile terminal is attracting attention.

Existing digital broadcast receiving terminals do not support multi-capture functionality available to a digital camera, that is, the function of rapidly capturing a series of images of a moving object at a designated time.

Due to rapid scene changes, digital broadcast receiving terminal users cannot capture a desired image easily while viewing a digital broadcast program, such as an image of a specific movie star, a series of breathtaking moments in a sports game, or an impressive scene from a show.

SUMMARY OF THE INVENTION

An object of the present invention is to substantially solve at least the above problems and/or disadvantages and to provide at least the advantages below. Accordingly, the present invention provides a method of sequentially capturing real-time output digital broadcast images in a digital broadcast receiving terminal.

The present invention also provides a method of capturing an intended digital broadcast image while viewing digital broadcasting in a digital broadcast receiving terminal.

According to one aspect of the present invention, in a method of capturing digital broadcast images in a digital broadcast terminal, upon request for output of digital broadcasting from a user, video frames of received digital broadcast frames are decoded. Upon request for multi-capture from the user, digital broadcast images of the decoded video frames are captured at a predetermined number of shots per unit time and stored.

It is preferred that the number of shots per unit time is preset. It is further preferred that the captured broadcast images are displayed, overlaid at a predetermined position on a currently displayed digital broadcast scene, after capturing the broadcast images.

According to another aspect of the present invention, in a method of capturing digital broadcast images in a digital broadcast receiving terminal, upon request for output of digital broadcasting from a user, video frames of received digital broadcast frames are output. Upon request for multi-capture from the user, Intra frames (I-frames) are extracted from the video frames received for a unit time and stored as still images.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Figure 1:
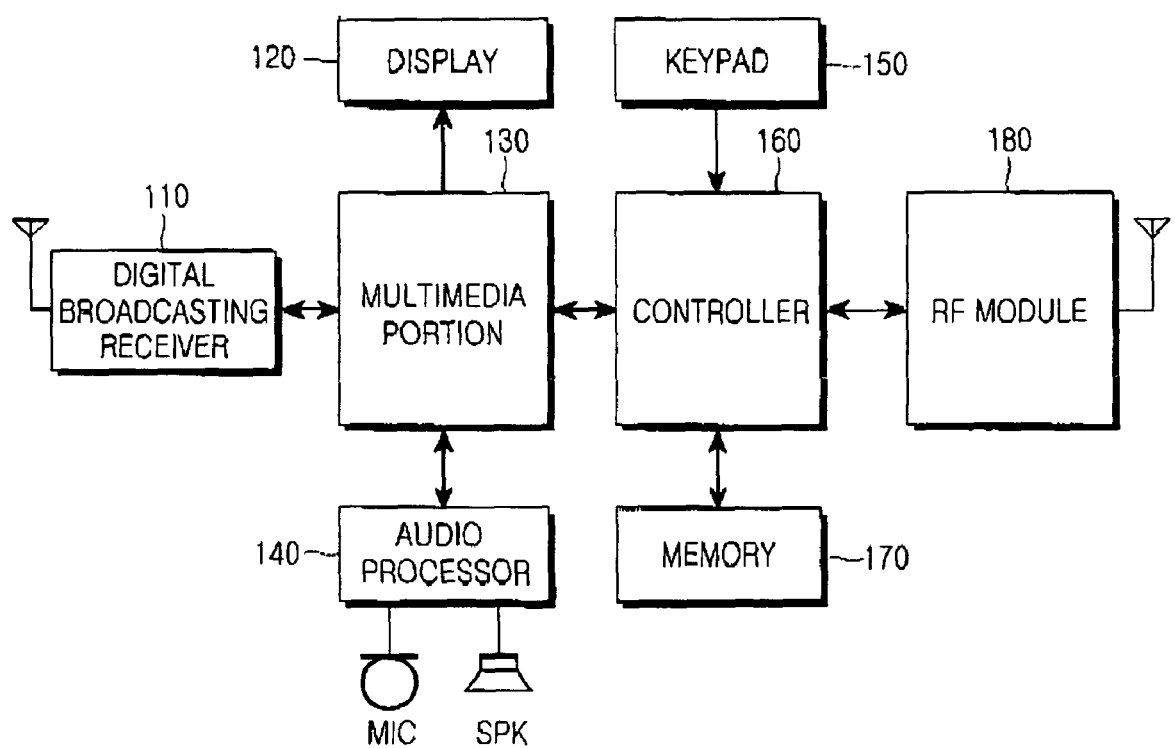
FIG. 1 is a block diagram of a digital broadcast receiving terminal according to the present invention.

FIG. 1 is a block diagram of a digital broadcast receiving terminal according to the present invention. Referring to FIG. 1, the digital broadcast receiving terminal 100 includes a digital broadcasting receiver 110, a display 120, a multimedia portion 130, an audio processor 140, a keypad 150, a controller 160, a memory 170, and a Radio Frequency (RF) module 180.

The digital broadcasting receiver 110 demodulates a received digital broadcasting frame under the control of the controller 160. Thus, it may include a demodulator (not shown).

The display 120 outputs a variety of video data generated from the digital broadcast terminal 100. It is preferably configured to have a Liquid Crystal Display (LCD) which sufficiently supports the resolution of digital broadcasting data. If the LCD is implemented in a touch screen fashion, the display 120 also functions as an input portion.

The multimedia portion 130 demultiplexes the demodulated digital broadcasting frame received form the digital broadcasting receiver 110 into a video frame and an audio frame and decodes them to an analog video signal and an analog audio signal, respectively.

To be more specific, the multimedia portion 130 demultiplexes the digital broadcasting frame into a video frame and an audio frame, decodes the frames, and extracts YUV (color space used in television broadcast standards) data from the decoded video frame. The multimedia portion 130 then writes the YUV data in a frame buffer (not shown) of the display 120 and the YUV data is output to the display 120. The YUV data is known to those skilled in the art and thus its detailed description is not provided herein.

The audio processor 140 modulates an electrical signal received through a microphone (MIC) to voice data. It also demodulates voice data received from the RF module 180 to an electrical signal and outputs the electrical signal through the speaker (SPK). The audio processor 140 preferably has a COder-DECoder (CODEC) (not shown) for converting a digital audio signal received from the RF module 180 to an analog audio signal, for reproduction and for converting an analog audio signal generated from the microphone to a digital audio signal. The CODEC is comprised of a data CODEC for processing packet data and an audio CODEC for processing an audio signal such as voice. The CODEC may be incorporated into the controller 160.

The keypad 150 provides key input data or voice input data corresponding, respectively, to a user-pressed key or user-uttered voice to the controller 160. A key for requesting output of digital broadcasting data and a key for multi-capturing digital broadcast images can be designated among keys provided in the keypad 150, or separately procured.

The controller 160 (e.g. an MSM) provides overall control to the digital broadcast receiving terminal 100 according to the embodiment of the present invention. Upon user request for outputting digital broadcasting data, the controller 160 controls a digital broadcast frame received from the digital broadcasting receiver 110 to be output to the display 120 and the audio processor 140.

When a user requests multi-capture function by pressing a predetermined key, for example during digital broadcasting, the controller 160 controls taking a predetermined number of shots of digital broadcast images per unit time and storing them in the memory 170. The predetermined key is a key designated among the keys of the keypad 150 or separately provided, for the multi-capture function.

In response to the user request for the multi-capture function, the controller 160 also extracts Intra frames, called I-frames, among received video frames for a unit time (e.g. 1 second) by controlling the multimedia portion 130. The controller 160 controls the extracted I-frames to be converted to Joint Photographic Coding Experts Group (JPEG) frames and stored in the memory 170. The JPEG conversion is performed by adding JPEG headers to the I-frames.

The memory 170 stores information required to control the operation of the digital broadcast receiving terminal 100 and still images captured during digital broadcasting under the control of the controller 160 according to the present invention.

The RF module 180 is responsible for transmission and reception of audio data, text data, video data, and control data under the control of the controller 160. For this purpose, the RF module 180 includes an RF transmitter (not shown) for upconverting the frequency of a transmission signal and amplifying the upconverted signal, and an RF receiver (not shown) for low-noise amplifying a received signal and down-converting the frequency of the low-noise-amplified signal. While not shown, the RF module 180 may have a MODEM comprised of a transmitter for encoding and modulating the transmission signal and a receiver for demodulating and decoding the received signal.

Figure 2:
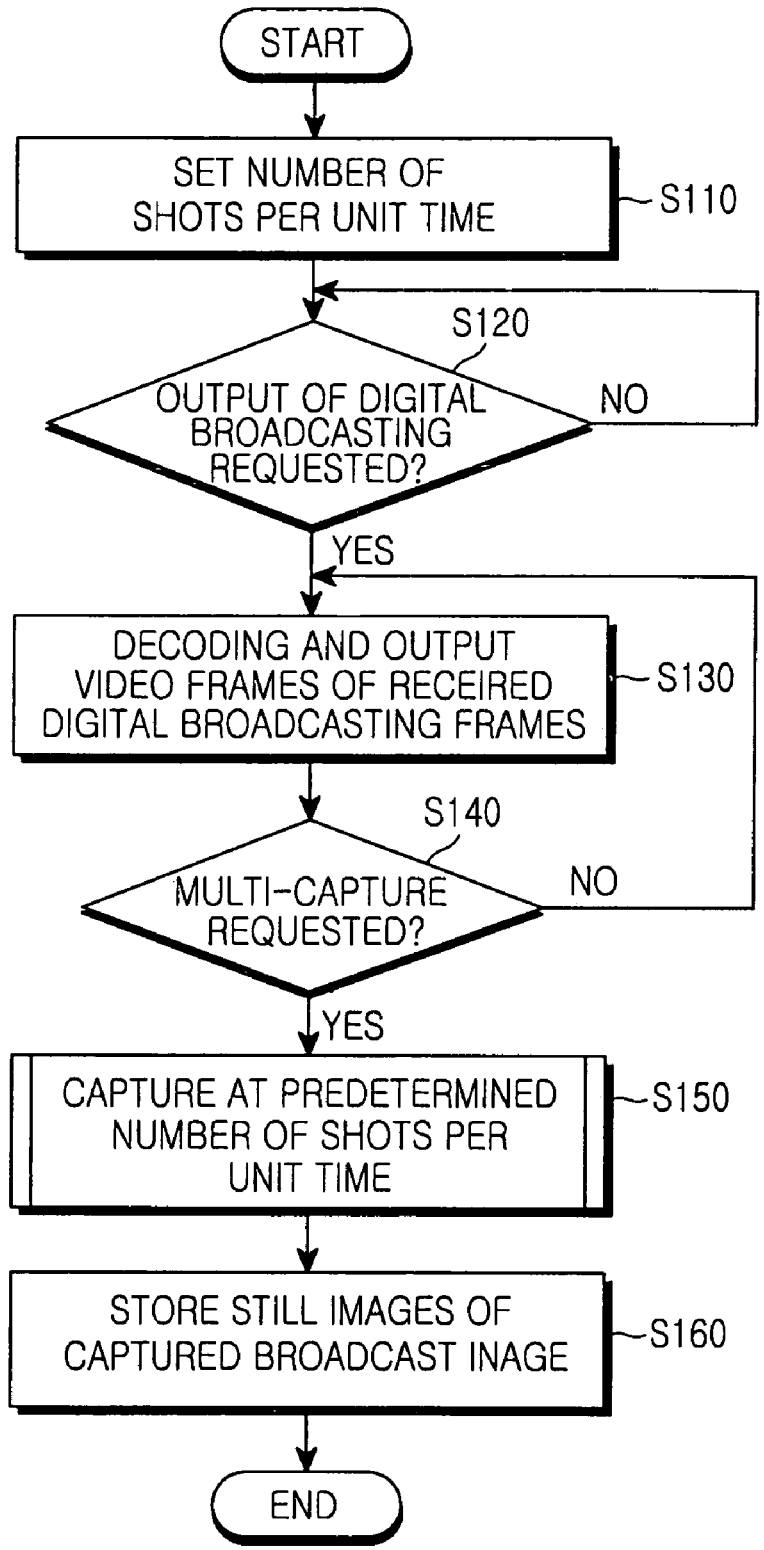
FIG. 2 is a flowchart illustrating an operation of the digital broadcast receiving terminal according to the present invention.

FIG. 2 is a flowchart illustrating an operation of the digital broadcast receiving terminal according to the present invention.

Referring to FIGS. 1 and 2, the controller 160 sets the number of shots per unit time by user selection in step S110. Since 30 digital broadcast frames are received per second, the unit time is preferably 1 second. In setting the number of shots per unit time, the controller 160 can display at least one predetermined setting item (e.g. 4 shots per second or 6 shots per second) so that the user can select the number of shots. Or the user can enter his desired number of shots per unit time through a predetermined input window.

In step S120, the controller 160 determines whether the user has requested output of digital broadcasting data by a digital broadcasting output request key, a broadcasting reproduction key, or a Menu key in the keypad 150. Upon request for digital broadcasting output, the controller 160 receives a corresponding digital broadcast frame from the digital broadcasting receiver 110, decodes the digital broadcast frame through the multimedia portion 130, and outputs the decoded frame to the display 120 and the audio processor 140 in step S130. The digital broadcast frame output to the display 120 is a decoded video frame and that output to the audio processor is a decoded audio frame. The subject matter of the present invention relates to the video frame and thus a detailed description of outputting the audio frame is not provided herein.

In step S140, the controller 160 determines whether the user has requested the multi-capture function during the digital broadcasting. The multi-capture function captures a plurality of images, that is, at least two successive images. The user can request the multi-capture function by entering a key designated for the multi-capture function. An existing key in the keypad 150 or an additionally provided key can be used as the multi-capture function request key.

Upon request for the multi-capture function, the controller 160 controls the multimedia portion 130 to capture a number of digital broadcast images of the decoded video frame equal to the predetermined number of shots per unit time in step S150. Step S150 will be described in more detail with reference to FIG. 3.

Figure 3:
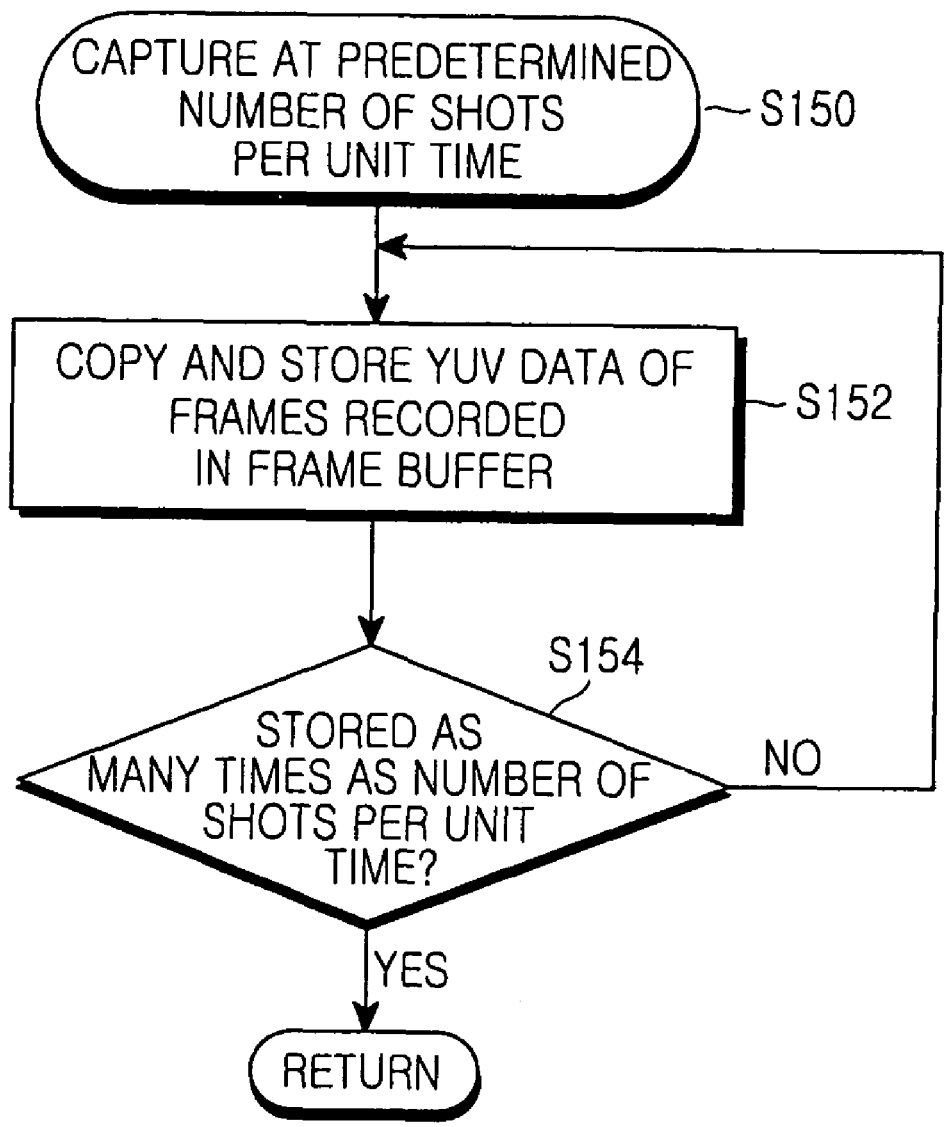
FIG. 3 is a detailed flowchart illustrating an operation for taking a predetermined number of shots of digital broadcast images per unit time in the operation illustrated in FIG. 2.

Referring to FIG. 3, upon request for the multi-capture function, the controller 160 controls the multimedia portion 130 to copy the YUV data of video frames buffered in the frame buffer (not shown) of the display 120 and temporarily store the copies in the memory 170 in step S152. If 4 shots are set per second, the controller 140 controls the multimedia portion 130 to copy the YUV data 4 times per second, in other words, once per 0.25 second.

The controller 160 determines whether the YUV data has been stored a number of times equal to the predetermined number of shots per second in step S154. That is, the controller 160 compares the predetermined number of shots per unit time with the number of copy and storage operations of the YUV data.

If the number of storage operations is different from the predetermined number of shots per second, the controller 160 repeats S152 until the two numbers become equal. If the numbers are equal, the controller 160 ends the capturing procedure and goes to step S160 of FIG. 2. Referring to FIG. 2 again, in step S160, the controller 160 stores the captured still images in the memory 170.

Meanwhile, the controller 160 can overlay the captured still images at a predetermined position onto a current output digital broadcast scene displayed on the display 120. It is preferred that the controller 160 displays the still images in the form of a bitmap (BMP) file. It is further preferred that the size of the BMP file is appropriately resized. That is, Moving Picture Experts Group (MPEG) digital broadcast images are captured and compressed to JPEG images. These JPEG images are converted to a standard graphic file format, namely a BMP file format and then displayed. This is because an MPEG file and a JPEG file cannot be displayed together on the display 120.

If the display 120 is divided into a main LCD and a sub-LCD, the controller 160 can output the decoded video frame in real time on the main LCD and the captured still images on the sub-LCD.

The captured still images can be displayed together at one time or separately displayed one by one.

While displaying the captured still images on the display 120, the controller 160 can output a voice or text message asking whether to store the still images. If the user has requested storage of his desired still image/images, the controller 160 controls the still image/images to be stored in the memory 170.

In the case where all the captured still images are to be displayed at a time, the user is prompted to select one or multiple images. The controller 160 stores at least one user-selected still image (i.e. broadcast image) in the memory 170.

In the case where the still images are to be individually displayed, the user is prompted to select the displayed image each time it is displayed. Upon user request for image storing, the controller 160 preferably stores the current displayed still image. Along with the still images, the user can store a broadcasting channel number, the title of a broadcast program, and program description.

Figure 4:
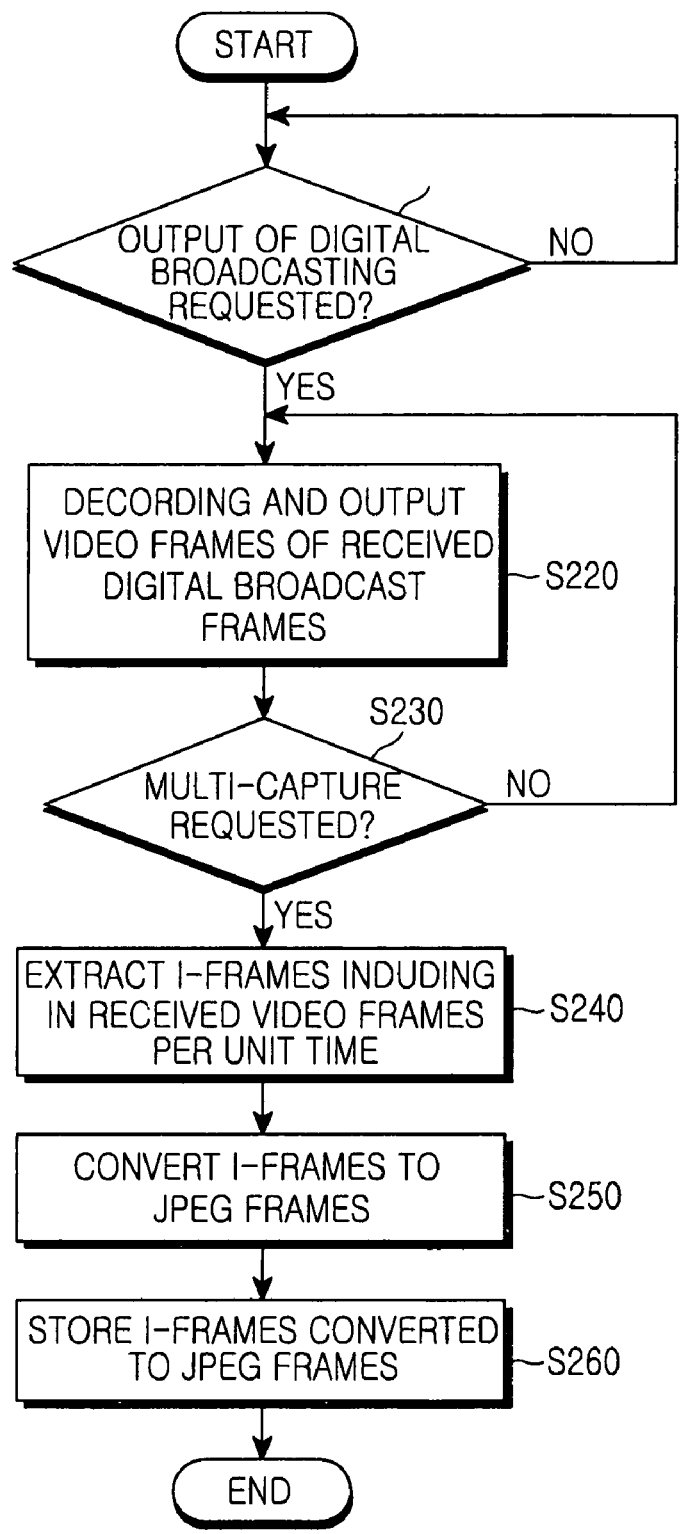
FIG. 4 is a flowchart illustrating an operation of the digital broadcast receiving terminal according to the present invention.

FIG. 4 is a flowchart illustrating an operation of the digital broadcast receiving terminal according to the present invention. Referring to FIGS. 1 and 4, in step S210, the controller 160 determines whether the user has requested output of digital broadcasting data by a digital broadcasting output request key, a broadcasting reproduction key, or a Menu key in the keypad 150.

Upon request of digital broadcasting output, the controller 160 receives a corresponding digital broadcast frame from the digital broadcasting receiver 110, decodes the digital broadcast frame through the multimedia portion 130 to audio and video frames, and outputs the decoded frames in step S220.

In step S230, the controller 160 determines whether the user has requested the multi-capture function during the digital broadcasting. The user can request the multi-capture function by entering a key designated for multi-capture. An existing key in the keypad 150 or an additionally provided key can be used as the multi-capture function request key.

Upon request of multi-capture, the controller 160 controls the multimedia portion 130 to extract I-frames from video frames (e.g. 30 video frames) received per unit time (i.e. 1 second) in step S240. The I-frames will be described in brief.

There are three types of MPEG-2 frames: Intra frame (I-frame), Predicted frame (P-frame), and Bi-directional frame (B-frame). I-frame is encoded or decoded on its own irrespective of other frames. It has the lowest compression rate among I, P and B frames. P-frame is calculated from the previous frame. The difference between the previous frame and the current frame is calculated and encoded. B-frame is a bi-directional interpolated frame. This implies that B-frame is created using the previous and next frames.

A set of consecutive images each starting with I-frame is called Group Of Picture (GOP). Typically in the MPEG frame structure, the I-frame, P-frame and B-frame are sequentially arranged in the GOP in the order of I-P-P-P-B-B-P-B-B-P-I-P-P-P-B-B-B-P-I-P-P-B-B. The number of I-frames per digital broadcast frame is not fixed. Therefore, at least one I-frame randomly exists in 30 video frames per second. The MPEG frame may only contain I frames and P frames.

The controller 160 converts I-frames extracted from video frames received per unit time (i.e. 1 second) by adding JPEG headers to the I-frames in step S250. Specifically, the controller 160 partially decodes the DCT coefficients of the I-frames, scales them, and converts the scaled I-frames to the JPEG frames. The partial decoding and scaling of DCT coefficients is a well known technology in the field and thus will not be described in detail herein.

The controller 160 then stores the JPEG frames in the memory 170 in step S260.

Before storing the JPEG frames, the controller 160 can overlay the JPEG frames at a predetermined position onto a current output digital broadcast scene displayed on the display 120. It is preferred that the controller 160 converts the JPEG frames to a BMP file, for displaying because an MPEG file and a JPEG file cannot be displayed together on the display 120.

Also, the I-frames converted to the JPEG frames can be displayed together at one time or separately displayed one by one.

During display of the captured still images on the display 120, the controller 160 can output a voice or text message asking whether to store the still images. If the user has requested storage of his desired I-frame/I-frames, the controller 160 controls the I-frame/I-frames to be stored in the memory 170.

In the case where the I-frames are to be displayed at a time, the user is prompted to select one or multiple I-frames and the controller 160 stores at least one user-selected I-frame in the memory 170.

In the case where the I-frames are to be displayed individually, the user is prompted to select the displayed I-frames each time they are displayed. Upon user request for I-frame storage, the controller 160 stores the currently displayed I-frame as a still image. Along with the I-frames, the user can store a broadcasting channel number, the title of a broadcast program, and program description.

While the multimedia portion 130 is separately provided in the digital broadcast receiving terminal 100, it can be incorporated into the controller 160.

As described above, the present invention enables capturing of a series of user-desired images during digital broadcasting. Therefore, despite rapid broadcast scene changes, he can get a desired image easily while viewing a digital broadcast program, such as an image of a specific movie star, a series of breathtaking moments in a sports game, or an impressive scene from a show.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of capturing digital broadcast images in a digital broadcast terminal, comprising the steps of:

decoding video frames of received digital broadcast frames and outputting the decoded video frames, upon request for output of digital broadcasting from a user;

capturing digital broadcast images of the decoded video frames at a predetermined number of shots per unit time, upon request for a multi-capture function from the user; and storing the captured broadcast images, wherein the capturing step comprises copying YUV data of video frames buffered in a frame buffer of the digital broadcast receiving terminal a number of times equal to the predetermined number of shots per unit time.

2. A method of capturing digital broadcast images in a digital broadcast terminal, comprising the steps of:

decoding video frames of received digital broadcast frames and outputting the decoded video frames, upon request for output of digital broadcasting from a user;

capturing digital broadcast images of the decoded video frames at a predetermined number of shots per unit time, upon request for a multi-capture function from the user;

storing the captured broadcast images; and displaying the captured broadcast images, while overlaying the captured broadcast images at a predetermined position on a currently displayed digital broadcast scene, after capturing the broadcast images.

3. The method of claim 2, wherein the displaying step comprises displaying all of the captured broadcast images at the predetermined position on the digital broadcast scene.

4. The method of claim 3, wherein the storing step comprises selecting at least one broadcast image selected from among the displayed broadcast images.

5. The method of claim 2, wherein the displaying step comprises sequentially displaying the captured broadcast images at the predetermined position on the digital broadcast scene.

6. The method of claim 5, wherein the storing step comprises storing a currently displayed broadcast image, and storing the selected broadcast image.

7. The method of claim 2, wherein the displaying step comprises converting still images of the captured broadcast images to a bitmap file and displaying the bitmap file.

8. A method of capturing digital broadcast images in a digital broadcast receiving terminal, comprising the steps of:

outputting video frames of received digital broadcast frames, upon request for output of digital broadcasting from a user;

extracting Intra frames (I-frames) from video frames received for a unit time, upon request for a multi-capture function from the user; and storing the extracted I-frames as still images;

wherein storing the extracted I-frames comprises:

converting the extracted I-frames to joint photographic coding experts group (JPEG) frames and storing the JPEG frames;

and wherein storing the JPEG frames comprises;

partially decoding and scaling Discrete Cosine Transform (DCT) coefficients of the extracted I-frames;

converting the scaled I-frames to the JPEG frames by adding JPEG headers to the I-frames; and storing the JPEG frames.

9. The method of claim 8, further comprising:

displaying the I-frames converted to the JPEG frames, while overlaying the I-frames at a predetermined position on a currently displayed digital broadcast scene.

10. The method of claim 9, wherein the displaying step comprises displaying all of the I frames converted to the JPEG frames at the predetermined position on the digital broadcast scene.

11. The method of claim 10, wherein the storing step comprises of storing at least one I-frame selected from among the displayed I-frames.

12. The method of claim 9, wherein the displaying step comprises sequentially displaying the I-frames converted to the JPEG frames at the predetermined position on the digital broadcast scene.

13. The method of claim 12, wherein the storing step comprises selecting a currently displayed I-frame, and storing the selected I-frame.

14. The method of claim 9, wherein the displaying step comprises converting the still images of the I-frames to a bitmap file and displaying the bitmap file.

* * * * *